June 7, 1966      D. C. ANDERSON      3,254,766
APPARATUS AND METHOD FOR SIFTING PARTICULATE BULK MATERIAL
Filed March 28, 1963      2 Sheets-Sheet 1
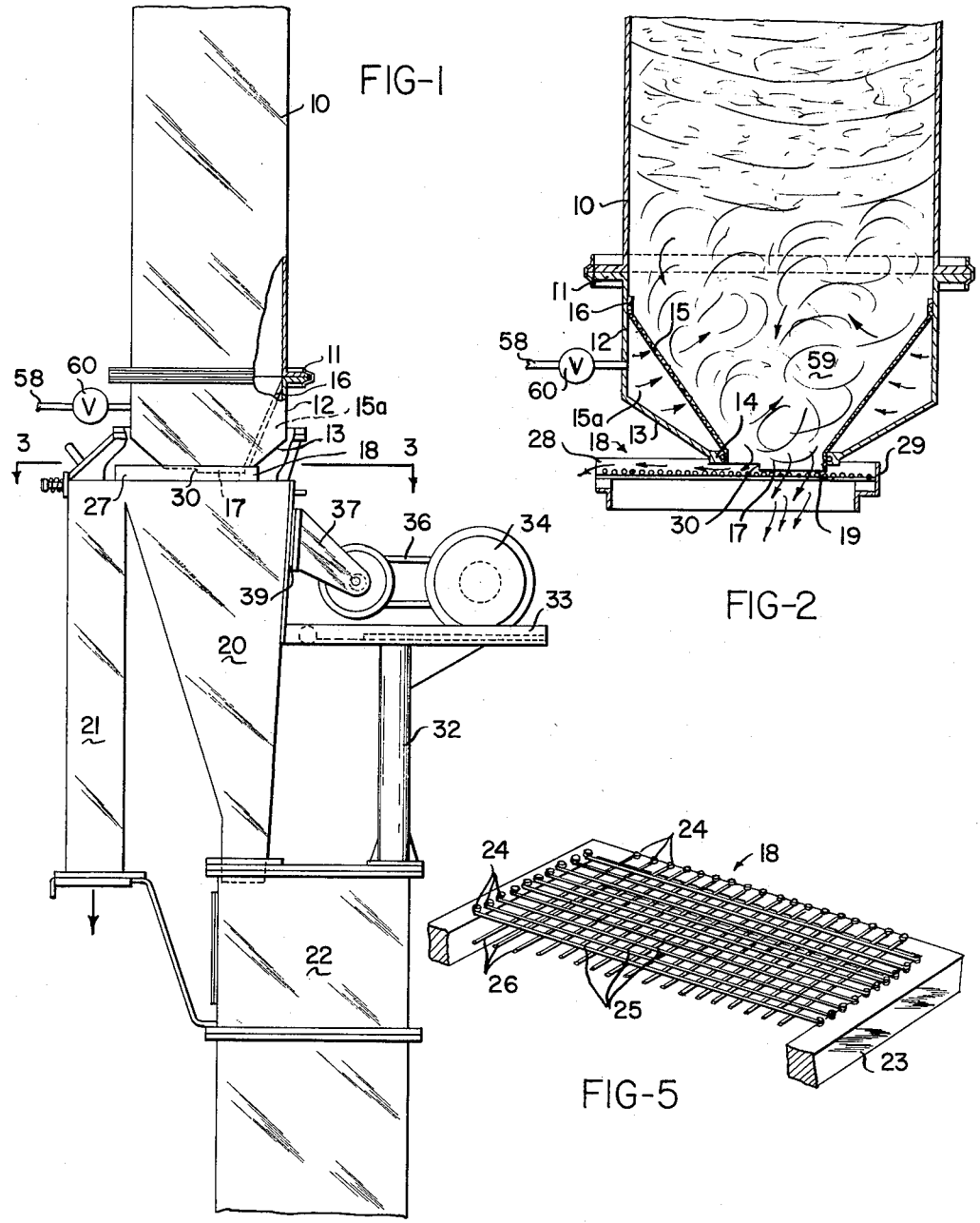
INVENTOR.
DONALD C. ANDERSON
BY
*Fredrick H. Braun*
ATTORNEY

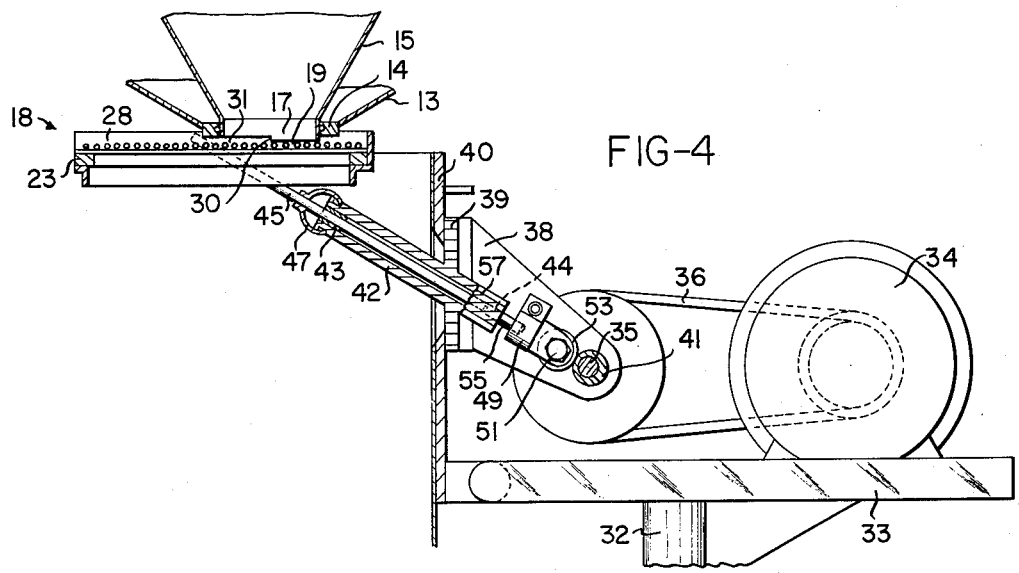
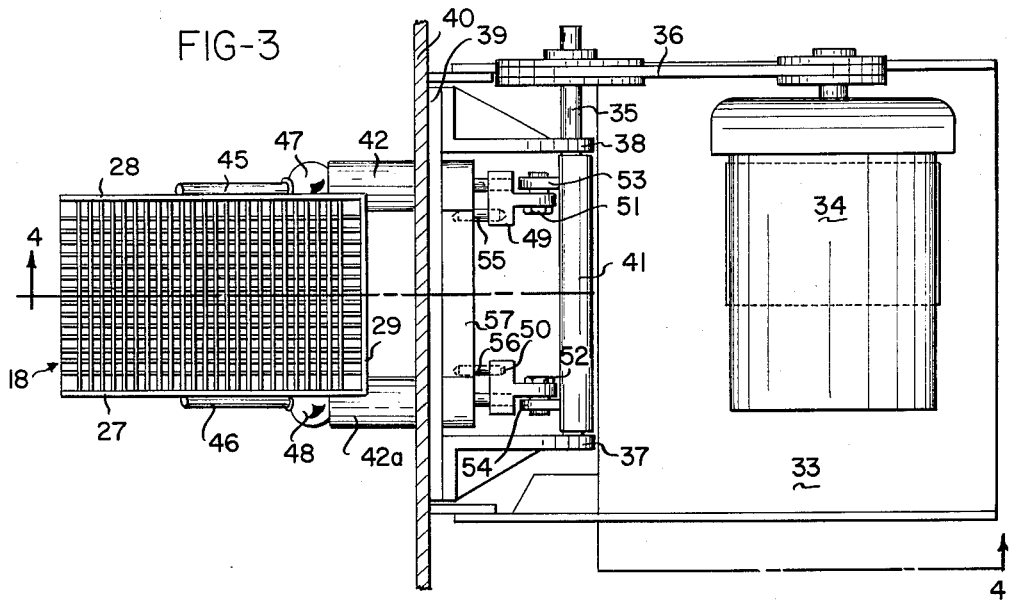

United States Patent Office

3,254,766
Patented June 7, 1966

3,254,766
APPARATUS AND METHOD FOR SIFTING PARTICULATE BULK MATERIAL
Donald C. Anderson, Northfield, Minn., assignor to The Procter & Gamble Company, Cincinnati, Ohio, a corporation of Ohio
Filed Mar. 28, 1963, Ser. No. 268,696
6 Claims. (Cl. 209—245)

The present invention relates to an apparatus and method for sifting particulate bulk material for the purpose of removing oversized particles and foreign objects. More particularly, the invention pertains to a sifting apparatus and method which is espeecially useful in sifting prepared baking mix products of the type described in U.S. Patent 2,874,051—Bedenk et al. issued February 17, 1959, in order to assure the removal of all undesirable particles and objects from the finished product being prepared for sale.

While throughout this specification the apparatus and method will be referred to as applied to the sifting of prepared baking mixes, it will be understood that its utility is not so limited. The scope of the invention is broadly applicable to the sifting of any particulate bulk material regardless of its character or properties, but it is particularly useful in sifting of materials having the character of baking mixes as more fully hereinafter described.

Sifting of prepared baking mixes at substantially high rates is a difficult problem due to the very nature of the baking mix itself. The material is basically composed of sugar, shortening and flour. It will be appreciated by those skilled in the art that a composition containing a preponderance of these materials will be very difficult to sift efficiently because the shortening is substantially dispersed in a thin film throughout the mix. This, of course, results in a product which is sticky by its very nature.

Prior to the present invention, a number of commercially available sifters were tested. In addition, a lifting wire separator as described and claimed in U.S. Patent 3,106,524 issued to Gene R. Wolfe et al. on October 8, 1963, was invented which is commonly owned by the assignee of the present application. Several other methods for sifting by the use of screens, vibrating screens and screens with various and sundry associated mechanisms were all found to be wanting in one or more respects to achieve the ultimate objective of sifting at the very high rates that have finally been attained with the present invention. Most of these prior attempts were considered inadequate from a capacity standpoint to meet the production rates of present day manufacturing facilities because of such factors as size, cost, poor sifting efficiency, high cleaning and repair costs, excessive vibration as well as many other reasons and combinations of these reasons.

The principal object of the present invention is to overcome the deficiences found in prior art sifting devices in order to devise a commercially practical sifting apparatus and method having a very high sifting rate per unit area.

A further object of the invention is to devise a sifting apparatus and method of the character described that can be easily incorporated with associated production equipment of a prepared baking mix manufacturing facility.

Still a further object of the invention is to devise a sifting apparatus and method in which oversize and undesirable objects are removed from the mix without the use of mechanical rakes or plows.

Yet another object of the invention is the provision of an apparatus and method for sifting prepared baking mixes and the like at rates in excess of 1,000 pounds per hour per square inch of sifting screen. It is also an object of the invention to achieve these rates with a minimum of noise and vibration when compared to commercial shaking sifters.

Another object of the invention is the provision of an apparatus and method for sifting in which product flow can be easily started and stopped for process control reasons. This is accomplished by regulating the inflow of a fluidizing medium.

The nature and substance of the invention can be summarized briefly as comprising a hopper for receiving the material to be sifted. The lower portion of the hopper includes a zone for receiving a fluidizing medium. The fluidizing medium is injected into the lower portion of the hopper at a rate to fluidize the material in the lower portion of the hopper only. The bottom outlet of the hopper is located in close proximity to a screen and the fluidized material is continuously discharged from the outlet so that it is in a fluidized state as it passes through the screen. The screen is vibrated at substantially high speeds thereby causing oversized and undesirable objects to be vibrated off the edge of the screen and at the same time permitting high sifting rates because of the fluidized condition of the material passing through the screen.

While the specification concludes with claims particularly pointing out and distinctly claiming the subject matter regarded as forming the present invention, it is believed the invention will be better understood from the following description taken in connection with the accompanying drawings in which:

FIGURE 1 is an elevation of an apparatus for accomplishing the objects of the invention with a portion of the upper product hopper partially broken away in order to better illustrate the structure of the apparatus.

FIGURE 2 is a cross section of the lower portion of the upper product hopper showing the plenum chamber, the hopper outlet and the screen.

FIGURE 3 is a plan view taken on the line 3—3 of FIGURE 1 showing the details of the screen and its vibrating means but with the hopper portions and its outlet removed for clarity of illustration.

FIGURE 4 is an elevation, partially in cross section, taken on the line 4—4 of FIGURE 3 showing further details of the screen vibrating mechanism, wherein one of the screen supports is shown in partial cross section, and in which the lower portion of the upper hopper and its outlet have been added.

FIGURE 5 is an isometric view of the screen which has been broken away partially in order to more clearly illustrate its structure.

Referring now to the drawings, the apparatus is composed of an upper product hopper 10 which has a flanged connection 11 by which it is attached to a lower hopper section 12 as illustrated in FIGURES 1 and 2. The lower hopper section 12 has a converging conical wall 13, the inner end of which is attached to a ring 14. Inside the lower hopper section 12 is a perforated or porous plenum screen 15, the upper end of which is attached peripherally at 16 to the inside wall of the lower hopper section 12 and the lower end of which forms the outlet nozzle 17 and is attached to the inner periphery of the ring 14. The annular space between the plenum screen 15 and the lower hopper section 12 including the converging conical wall 13 defines the plenum chamber 15a.

A screen 18 is mounted below the nozzle 17 and in close proximity thereto leaving a narrow gap 19 between the nozzle and the screen. The gap 19 may be varied to obtain different effects, i.e. the larger the gap the more material will be conveyed off the screen as will be later described. Material passing through the screen is deposited in the lower product hopper 20 and oversized and foreign material which is removed from the screen is deposited in the tailings hopper 21. The screened product flows from the hopper 20 into the hopper 22 of a conventional filling machine.

The details of one form of screen that can be used will now be described. As shown in FIGURE 5, the screen consists of a frame 23 having wire mounting pins 24 secured thereto and mounted in spaced relation around the frame. The wires 25 form one layer of the screen and are substantially equally spaced and substantially in the same plane. The wires 25 are connected at their ends to wire mounting pins 24 on opposite sides of the frame. The wires 26 form a second layer of substantially equally spaced wires which are also in substantially the same plane and the ends of which are attached to the mounting pins 24 as in the case of the wires 25. The planes of the wires 25 and 26 are substantially contiguous although no wire in either layer is attached to any wire in its own layer or in the adjoining layer. This permits free and independent vibration of each wire when the frame 23 is vibrated so that build up of sifted material at the intersection of the wires is entirely prevented.

Referring now to FIGURES 3 and 4, it will be noted that the frame 23 is provided with upstanding side walls 27 and 28 as well as an upstanding end wall 29. The side of the frame 23 nearest the tailings hopper 21 has no side wall which further encourages the oversized and foreign particles to be moved laterally into the tailings hopper when the screen is vibrated.

In order to permit the removal of unusually large foreign objects and ususually large particles of material, a notch 30 may be provided in the outlet nozzle 17. Thus, the gap 31 is somewhat larger than the gap 19 and the gap 31 faces the tailings hopper 21.

The mechanism for vibrating the screen will now be described. Referring first to FIGURE 1, this mechanism is supported by a column 32 and a horizontal support 33. The support 33 being illustrated in greater detail in FIGURES 3 and 4. A motor 34 drives a shaft 35 through a conventional belt drive 36. The shaft 35 is supported by bearings (not shown) mounted in the brackets 37 and 38, the brackets being attached to the plate 39 which is secured to a reinforcing member 40 attached to the side of the lower product hopper 20. An eccentric 41 is secured to the shaft 35 and rotates therewith. A pair of cylindrical bearing brackets 42 and 42a are fixed to the plate 39. As seen in FIGURE 4, the bracket 42 contains internal bushings 43 and 44 at its ends. A slide rod 45 has one end secured to the side of the screen frame 23 and is mounted for sliding movement in the bushings 43 and 44. As seen in FIGURE 3, the slide rod 46 is mounted for sliding movement in the bracket 42a in similar fashion. The end of slide rod 46 is secured to the side of screen frame 23 as shown. Rubber seals 47 and 48 are provided over the ends of each bearing bracket 42 and 42a. These prevent the sifted particulate material from entering inside the brackets 42 and 42a The lower end of the slide rods 45 and 46 are secured to brackets 49 and 50, respectively. Studs 51 and 52, project laterally through each bracket 49 and 50, respectively. The outer ends of the studs 51 and 52 have a ball bearing 53 and 54, respectively, freely rotatable thereon. Compression springs 55 and 56 bear against the brackets 49 and 50, respectively, at one end and against the rib 57 at the other end. Thus, the springs 55 and 56 force the bearings 53 and 54 to remain in contact with the eccentric 41 so that on rotation of the latter, the slide rods 46 and 45 will be reciprocated at a frequency equal to the revolution of the shaft 35. The rib 57 is integral with the plate 39 and the bearing brackets 42 and 42a.

It is preferable to mount the slide rods 45 and 46 at an angle with respect to the horizontal in order that the screen will have a vertical and horizontal component of vibration. This latter feature is very important in causing the foreign particles to be quickly moved laterally from the screen into the tailings hopper 21. It has been found that with the slide rods 45 and 46 at an angle of about 30° with the horizontal, the apparatus operates very effectively. Best results have also been obtained when the eccentric 41 is rotated at a speed of at least 800 r.p.m. While these are not to be construed as limitations on the scope of the invention, it should be understood that for best results the frequency and angle of vibration of this order are desirable when prepared baking mixes are sifted.

In the operation of the apparatus and in practicing the method, the upper product hopper 10 is initially filled with a prepared baking mix or like material. A fluidizing medium such as air or a gas is introduced into the plenum chamber 15a from a suitable source through the inlet connection 58. The fluidizing medium passes through the apertured plenum screen 15 at a rate sufficient to fluidize the material in the fluidizing zone 59 in the lower portion of the hopper 10. This is illustrated in FIGURE 2. The material in the upper portion of the hopper 10 substantially prevents the fluidizing medium from flowing upwardly out of the hopper. Under some conditions of operation, a small portion of the fluidizing medium may flow out of the top of hopper 20, but under ordinary circumstances this does not occur. As the fluidizing material is delivered through the outlet 17, the remaining material in the upper portion of the hopper flows downwardly in slug-like fashion and in this manner it acts as an effective seal to limit the fluidizing zone 59 to the lower portion of the hopper.

The screen is vibrated in the previously described manner at the preferred frequency. The fluidizing material remains in a fluidized state as it flows from the nozzle 17 and as it passes through the screen 18. The gap 19 is maintained relatively narrow to make this feasible. When the screen is vibrated in this fashion at a frequency of 800 cycles or more per minute, it has been found possible to effectively sift prepared baking mixes at a rate of over 1,000 lbs. per hour per square inch of screen when using a 4 mesh screen with .016" diameter wires. While good results have been achieved using a square mesh screen, it will be understood that a rectangular mesh, a diamond shaped mesh, or even a parallel wire screen can be used to achieve the objects of the invention.

While in the preferred embodiment, a plenum chamber 15a is provided, it is possible to create a fluidizing zone 59 by merely injecting a fluidizing medium into the lower portion of the hopper 10. Thus, the apertured plenum screen 15 could be removed to achieve the basic objects of the invention if a sufficient quantity of fluidizing medium is introduced into the fluidizing zone 59.

Another important feature of the invention is that flow of material through the screen can be stopped by merely stopping the flow of the fluidizing medium to the fluidizing zone 59. For example, the valve 60 (FIGURE 2) could be shut off manually or automatically. This is a further indication of the critical need for maintaining the material in the zone 59 in a fluidized state and passing it through the screen while it is still fluidized. Stoppage of material flow in this manner can be achieved even while the screen is vibrated at its preferred frequency.

As previously stated, the invention has been developed specifically for sifting prepared baking mixes at the necessary rates to keep up with other production equipment currently used commercially in the packaging of such mixes. It will be appreciated that the principles herein disclosed will be applicable to many other particulate products and will be useful in many other applications. Nothing in this application should be construed as limiting its scope to the sifting of prepared baking mixes.

While particular embodiments of the invention have been illustrated and described it will be obvious to those

What is claimed as new is:

1. An apparatus for sifting bulk materials comprising the combination of an upper product hopper and a lower hopper section, said upper product hopper and said lower hopper section being rigidly secured by a flanged connection, said lower hopper section having a downwardly converging conical wall, a ring member secured to the lower end of said conical wall, a perforated plenum screen inside said lower hopper section, the upper end of said plenum screen being peripherally attached to the inside wall of the lower hopper section, the lower end of said plenum screen being attached to the inner periphery of said ring member and forming an outlet nozzle for said lower hopper section, an annular space defining a plenum chamber formed between the plenum screen and the lower hopper section including the downwardly converging conical wall thereof, an air inlet connection to said plenum chamber, a screen member mounted below said outlet nozzle and in close proximity thereto with a narrow gap remaining between said outlet nozzle and said screen member, said screen member comprising a frame having wire mounting pins positioned in spaced relation around the frame, a first set of wires forming one layer of the screen mounted in substantially equally spaced relationship on the wire mounting pins positioned on opposite sides of the frame, said first set of wires being substantially in the same plane, a second set of wires forming a second layer of the screen mounted in substantially equally spaced relationship on the wire mounting pins positioned on the frame so that said second set of wires is at substantially right angles to said first set of wires, said second set of wires being mounted in substantially the same plane so that the planes of the first and second set of wires are substantially contiguous with every wire in each layer being free of attachment to every wire in the adjoining layer where the wires in the respective layers intersect, said frame being provided with two upstanding side walls and one upstanding end wall, said screen member being mounted over a filling machine hopper, a tailings hopper being mounted under the free edge of the screen member, a screen vibrating mechanism, said mechanism being supported by a column and a horizontal support, a motor mounted on said horizontal support, a shaft driven by said motor through a belt drive, a reinforcing member secured to said lower product hopper and a plate attached to said reinforcing member, a pair of bracket supports secured to said plate, said bracket supports having bearings for receiving said shaft, an eccentric secured to said shaft and rotatable therewith, a pair of cylindrical bearing brackets fixed to said plate, said bearing brackets having internal bushings at their ends, a slide rod mounted for movement in each of said bearing brackets, the upper end of each slide rod being affixed to the frame of said screen at an angle thereto, a follower bracket secured to the lower end of each slide rod, a stud projecting laterally through each follower bracket, a ball bearing mounted on the outer end of each stud on each follower bracket and freely rotatable thereon, a compression spring bearing against each of said follower brackets at one end and against the said plate at the other end to force the said ball bearings into contact with said eccentric, rotation of said eccentric thereby causing vibration of said screen at a frequency equal to the rotational speed of said shaft, means for introducing air to said plenum chamber, means for simultaneously vibrating said screen at a frequency of at least 800 cycles per minute, said air in said plenum chamber being diffused through said plenum screen to fluidize the material in the lower hopper section, the material in the upper product hopper acting as a seal to inhibit outflow of fluidizing air through the top of the upper product hopper, the fluidized material flowing downwardly through the said outlet nozzle and being deposited on the screen member vibrating at least 800 cycles per minute, the vibration of the screen causing oversize and foreign particles to be conveyed off one side for deposit in the tailings hopper, the remaining material passing through the screen member into the filling machine hopper.

2. An apparatus for sifting bulk materials comprising the combination of a product hopper having a bottom outlet nozzle, an annular perforated plenum screen in the lower portion of said hopper defining a plenum chamber immediately above said outlet nozzle, an inlet to said plenum chamber for continuously feeding a supply of fluidizing medium thereinto, said fluidizing medium being continuously diffused through the perforated plenum screen to fluidize the material in the lower portion of said hopper while permitting outflow of fluidized material through said outlet nozzle, a sifting screen placed in closely spaced proximity beneath said outlet nozzle, the distance between said screen and said nozzle being such that the material leaving said nozzle remains fluidized as it passes through said screen, and means for vibrating said screen sufficiently to cause oversize and foreign particles to be conveyed off one edge of the screen with the remaining material being sifted through the screen, said screen being of square mesh composed of two layers of wires, the wires in each layer being substantially parallel to one another and the wires in each layer being substantially transverse to all the wires in the other layer, none of the wires of the screen in either layer being connected to any other wire in the other layer at each point where the respective wires in each layer intersect.

3. A method of sifting bulk particulate materials comprising the steps of filling a storage hopper with a product to be sifted, fluidizing the product by introducing a gaseous fluidizing medium in a fluidzing zone located in the lower portion of the hopper, preventing outflow of the gaseous fluidizing medium from the upper portion of the hopper by forming a plug with the material therein, limiting the quantity and pressure of the gaseous fluidizing medium introduced in said fluidizing zone to prevent upward flow of said gaseous fluidizing medium through said plug, allowing the fluidized material to issue from the bottom of the hopper while the material remains in a fluidized state, delivering the outflowing fluidized material to a sifting screen so that the material makes contact with the screen while in a fluidized state, vibrating said screen sufficiently to cause oversize particles and foreign objects to be conveyed off the screen, the sifting the remaining product through the openings in the screen while said product is in a fluidized state.

4. A method as claimed in claim 3 including the step of stopping material flow from the hopper by discontinuing fluidization of product in the fluidizing zone.

5. A method of sifting bulk particulate prepared baking mix materials comprising the steps of filling a storage hopper with a product to be sifted, introducing a gaseous fluidizing medium in the hopper to fluidize the product in a zone limited to the lower portion of the hopper, preventing outflow of the gaseous fluidzing medium from the upper portion of the hopper by forming a plug with the material therein, limiting the quantity and pressure of the gaseous fluidizing medium introduced in the lower portion of the hopper to prevent upward flow of said gaseous fluidizing medium through said plug, continuously delivering fluidized material from the bottom of the hopper to a sifting screen so that the material makes contact with the screen while in a fluidized state, vibrating said screen sufficiently to cause oversize particles and foreign objects to be conveyed off the screen, and passing the remainder of the product through the openings in the screen while the product is in a fluidized state.

6. A method as claimed in claim 5 including the step of vibrating the screen at a frequency of at least 800 cycles per minute.

References Cited by the Examiner

UNITED STATES PATENTS

| | | | |
|---|---|---|---|
| Re. 7,023 | 4/1876 | Affleck | 209—37 |
| 393,848 | 12/1888 | Nowvioch | 209—315 X |
| 815,855 | 3/1906 | McAdams | 160—371 |
| 1,252,390 | 1/1918 | Bremer | 209—236 |
| 1,801,195 | 3/1931 | Fraser | 209—474 |
| 1,971,852 | 8/1934 | Goebels | 222—195 |
| 2,774,516 | 12/1956 | Jensen | 222—195 |
| 3,062,414 | 11/1962 | Morris | 222—195 |

FOREIGN PATENTS

| | | |
|---|---|---|
| 1,139,131 | 6/1957 | France. |
| 374,849 | 11/1920 | Germany. |
| 440,463 | 6/1924 | Germany. |
| 827,265 | 1/1952 | Germany. |
| 12,185 | 5/1892 | Great Britain. |
| 372,319 | 6/1939 | Italy. |

HARRY B. THORNTON, *Primary Examiner.*

HERBERT L. MARTIN, *Examiner.*

R. HALPER, *Assistant Examiner.*